Aug. 29, 1950     H. I. STANBACK ET AL     2,520,478
FIRING SYSTEM FOR ELECTRIC DISCHARGE TUBES
Filed March 2, 1949
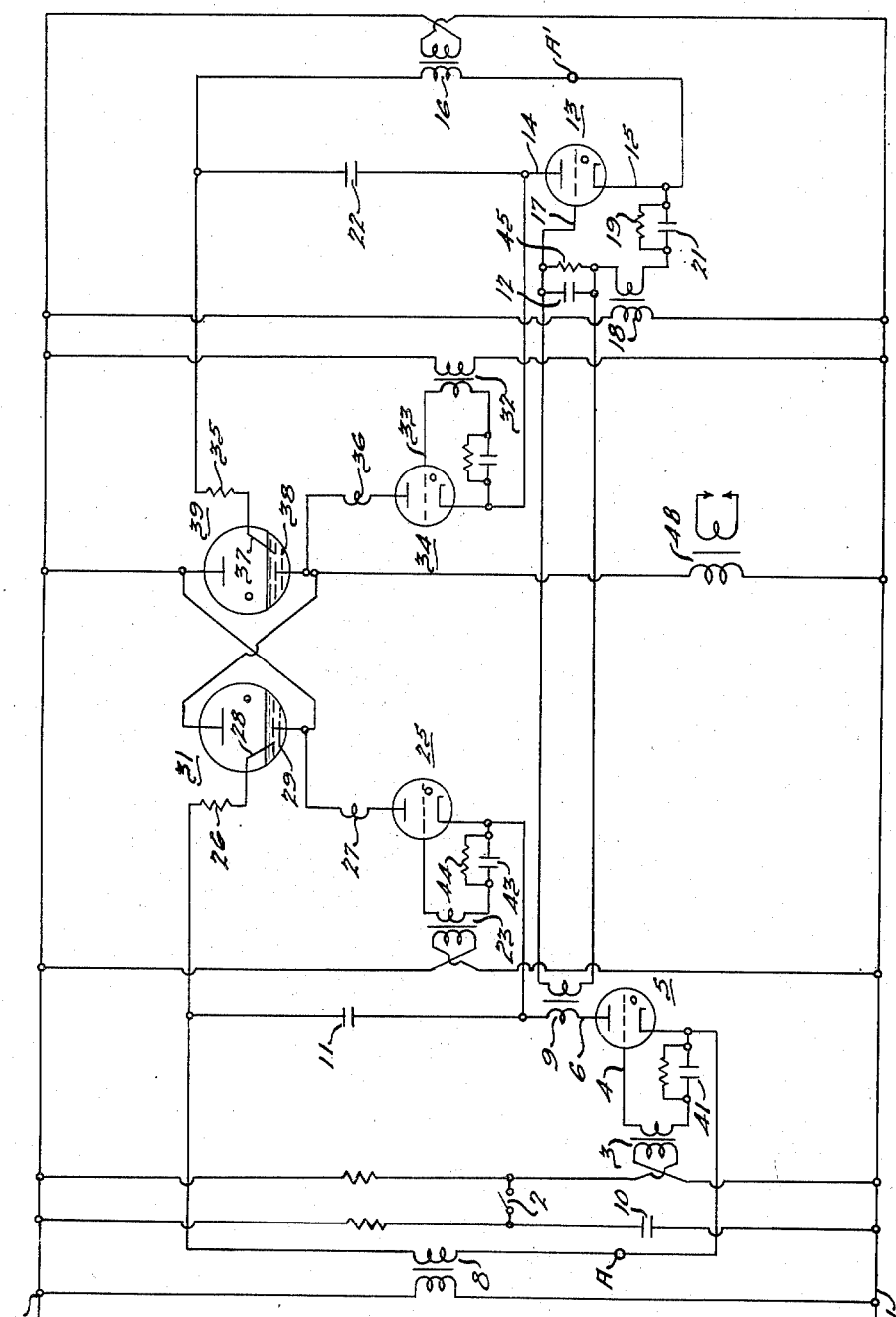
INVENTORS.
Harris I. Stanback,
Ernest G. Anger,
BY
Myron J. Seibold
ATTORNEY.

Patented Aug. 29, 1950

2,520,478

UNITED STATES PATENT OFFICE 2,520,478

FIRING SYSTEM FOR ELECTRIC DISCHARGE TUBES

Harris I. Stanback, Milwaukee, and Ernest G. Anger, Wauwatosa, Wis., assignors to Square D Company, Detroit, Mich., a corporation of Michigan Application March 2, 1949, Serial No. 79,214

6 Claims. (Cl. 315—246)

This invention relates to a firing system controlling the conduction of electric discharge tubes in which the system is arranged so that the voltages therein will not build up to create dangerous potentials during the standby (non-firing) condition.

In systems in which electric discharge tubes of the mercury pool cathode type are employed to control the passage of current through a load circuit, and particularly such systems in which a firing capacitor is charged and then discharged through the igniter circuit of the discharge tubes to effect conduction of the tubes, the introduction of the capacitor charging voltage into the firing control circuit may be and has been accompanied by a dangerous build-up of voltages within the system so as to be extremely hazardous to an electrician engaged in servicing or testing circuits of the system. This hazard is particularly present during the standby (non-firing) condition since during firing the flashing of the tubes is a sufficient warning of high voltages. The object of the invention is therefore to provide a discharge tube control system in which the build-up of voltages in the standby condition is substantially prevented.

Another object of the invention is to provide a firing circuit to control the ignition of electric discharge tubes in which the voltages therein are connected in opposed relation so that in the standby condition the resultant voltage will always be the arithmetical difference of the supplied voltages, so that the voltage of any one point in the system will never exceed the highest voltage supplied to the system.

Other objects and features of this invention will be readily apparent to those skilled in the art from the specification and appended drawing illustrating certain preferred embodiments in which the figure is a simplified schematic wiring diagram of the system illustrating the present invention.

In the appended drawing, cathode heaters, grid resistors, surge by-pass capacitors, and other conventional elements have been omitted to simplify the showing and description since they do not of themselves form a part of the invention, although they customarily would be present in an operating system.

The circuit diagram illustrating the invention includes an initiating switch 2 which may be a simplified representation of a timing circuit.

Before closure of the switch 2, the secondary voltage of transformer 3 supplies an alternating hold-off voltage to the grid 4 of valve 5 which is opposite in polarity to the voltage supplied by transformer 8 to the anode 6 and which, added to the negative charge drawn into capacitor 41 by grid conduction during the times the anode is negative, causes the grid normally to be negative at all instances when the anode is positive, thus preventing conduction. Closure of the switch 2 causes the phase of this voltage to be shifted by capacitor 10, so that the grid is positive when the anode is positive, the valve 5 thereby being caused to conduct. In series with the plate and cathode of valve 5 and the secondary of the firing charge supply transformer 8 is firing capacitor 11. The firing capacitor is selected to provide the capacity necessary for the discharge impulse required for firing the discharge tube.

Firing charge supply transformer 8 is polarized so as to supply a positive potential to the igniter 28 of the electric discharge tube 31 at the same time that a positive voltage is supplied to the cathode of the discharge tube by the supply line 1.

For controlling the firing current to the igniter circuit of an ignitron tube 31, there is provided an electric valve 25 having its anode and cathode in series with the igniter 28 and mercury pool 29 of ignitron tube 31 and with firing capacitor 11. The bias for the grid of valve 25 is supplied from transformer 23 and bias capacitor and resistor 43 and 44. Also in series with the igniter circuit are a resistance 26 and inductance 27 serving to properly shape the discharge pulse flowing through the igniter circuit when the valve 25 conducts.

A second ignitron tube 39 is shown in Figure 1 connected in inverse parallel with ignitron tube 31, so that both half cycles of the alternating current supply will be passed through the load, indicated by the welder transformer 48. Ignitron tube 39 has a firing control circuit similar to that of ignitron tube 31. The primary of transformer 16 is energized from the supply, the secondary of transformer 16 is connected across the firing capacitor 22 through the anode 14 and cathode 15 of valve 13. Transformer 16 is polarized so as to supply a positive potential to the igniter 37 of discharge tube 39 at the same time that the supply line supplies a positive potential to the cathode 38 of the discharge tube 39. Transformer 18, energized from the supply, is connected to supply hold-off bias to the grid 17 of electric valve 13 in cooperation with hold-off bias capacitor 21 bridged by resistor 19. Also provided in the grid circuit of valve 13 is a capacitor 12 bridged by resistor 45 and connected across the secondary of transformer 9, the primary of which is connected in series with electric valve 5 and the firing capacitor 11.

To control the firing current to the igniter of tube 39, electric valve 34 is connected across the firing capacitor 22 through the igniter 37 and mercury pool 38 of electric discharge tube 39. Resistor 35 and inductor 36 serve to properly shape the firing pulse. A transformer 32 energized from the supply is provided to supply holdoff bias to the grid 33 of valve 34 in conventional manner.

The firing control circuits for electric discharge tubes 31 and 39 may be accompanied by other control elements which could time the weld, control the sequencing of a welding operation, or accomplish other desired welding performance.

It will be seen that before the initiating switch is operated, there is no point in either of the charging or firing circuits associated with discharge tubes 31 and 39 at a potential above that of the higher of the two voltages supplied to each circuit, one of these voltages being that introduced from the supply and the other being that introduced by either the firing-charge supply transformer 8 or the firing-charge supply transformer 16. It will further be seen that the resultant of those two voltages, such as at A and A' in the appending drawing, will always be the arithmetical difference of the voltages supplied to the circuit since the voltage are connected in opposed relation.

The operation to fire an ignitron and initiate conduction thereof will be briefly described. Operation of the initiating means, simplified in the diagram to the closing of switch 2, causes a shift in phase of the voltage across the transformer 3 as previously described, this phase shift causing the transformer secondary to provide a positive voltage in the circuit of the grid of valve 5 at the time the anode 6 of valve 5 is positive so that the valve conducts. The conduction of valve 5 charges firing capacitor 11 from the secondary of transformer 8, through the primary of transformer 9. With capacitor 11 charged, the valve 5 is cut off and becomes non-conducting. When thereafter the bias on the grid of valve 25 becomes sufficiently less negative, the valve 25 conducts to discharge the capacitor 11 through the igniter of ignitron 31. This occurs when the anode of ignitron 31 is positive, and the ignitron conducts supply current to the load.

Each time electric valve 5 conducts to charge the firing capacitor 11, transformer 9 is energized. The secondary of transformer 9 delivers a charge to capacitor 12 in the grid circuit of electric valve 13. The secondary of transformer 16 is so polarized as to supply positive voltage to the anode 14 of electric valve 13 during the half cycle following that during which the capacitor 12 was charged. During that half cycle, the charge on capacitor 12 is discharged into the grid circuit of valve 13, providing a sufficiently positive voltage to the grid 17 to cause the valve 13 to conduct. The conduction of valve 13 serves to admit a charge supplied by the secondary of transformer 16 to the firing capacitor 22. Valve 13 then ceases to conduct. During the half cycle immediately following that during which valve 13 conducts, the grid 33 of electric valve 34 becomes sufficiently positive to cause valve 34 to conduct, discharging firing capacitor 22 through the igniter 37 and mercury pool cathode 38 of electric discharge tube 39. This occurs during a half cycle in which the anode of electric discharge tube 39 is positive; the discharge tube 39 therefore is caused to conduct current during a half cycle to the load, illustrated by welding transformer 48.

It will be seen from the description above that persons testing or servicing the excitation circuits of the igniters of the electric discharge tubes during the non-firing condition are protected from the dangers of high voltages resulting from the addition of the voltages supplied to the circuit, the highest voltage at any point in the circuit during that condition being no greater than the larger of the voltages applied to it, and the resultant of these voltages being smaller than the greater of them since the line voltage to the tube cathode and the supply voltage to the tube igniter are connected in the system in opposed relation.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

What is claimed is:

1. In a system for initiating the conduction of electric discharge tubes of the mercury pool cathode type, an electric discharge tube, a supply line connected to a load through said tube, a capacitor, a voltage supply, means for selectively connecting said voltage supply across said capacitor, means for discharging said capacitor through the igniter of said electric discharge tube, means for connecting said voltage supply to the igniter of said discharge tube independent of said discharge means and selective connection, said voltage supply so connected to said igniter circuit that in the non-firing condition the line voltage to the tube cathode and supply voltage to the tube igniter will be opposed so that the resultant voltage will be the arithmetical difference of the two voltages and the maximum voltage of any point in the control circuit will never exceed the greater of said line and supply voltages during the non-firing condition.

2. In a system for initiating the conduction of electrical discharge tubes of the mercury pool cathode type, an electric discharge tube, a supply line connected to a load through said tube, a capacitor, a voltage supply, means for selectively connecting said voltage supply across said capacitor, means including an electric valve for discharging said capacitor through the igniter of said electric discharge tube, means for connecting said voltage supply to the igniter of said discharge tube independent of said valve and selective connection, said voltage supply so connected to said igniter circuit that in the non-firing condition the line voltage to the tube cathode and supply voltage to the tube igniter will be opposed so that the resultant voltage will be the arithmetical difference of the two voltages and the maximum voltage of any point in the control circuit will never exceed the greater of said line and supply voltages during the non-firing condition.

3. In a system for initiating the conduction of electric discharge tubes of the mercury pool cathode type, an electric discharge tube, a supply line connected to a load through said tube, a capacitor, a voltage supply, means including an electric valve for connecting said voltage supply across said capacitor, means for discharging said capacitor through the igniter of said electric discharge tube, means for connecting said voltage supply to the igniter of said discharge tube independent of said valve and discharge means, said voltage supply so connected to said igniter circuit that in the non-firing condition the voltage to the tube cathode and supply voltage to the tube igniter will be opposed so that the resultant voltage will be the arithmetical difference of the two voltages and the maximum voltage of any point in the control circuit will never exceed the greater of said line and supply voltages during the non-firing condition.

4. In a system for initiating the conduction of electric discharge tubes of the mercury pool cathode type, an electric discharge tube, a supply line connected to a load through said tube, a capacitor, a voltage supply, means including an electric valve for connecting said voltage supply across said capacitor, means including an electric valve for discharging said capacitor through the igniter of said electric discharge tube, means for connecting said voltage supply to the igniter of said discharge tube independent of said valves, said voltage supply so connected to said igniter circuit that, in the non-firing condition the line voltage to the tube cathode and supply voltage to the tube igniter will be opposed so that the resultant voltage will be the arithmetical difference of the two voltages and the maximum voltage of any point in the control circuit will never exceed the greater of said line and supply voltages during the non-firing condition.

5. In a system for initiating the conduction of electric discharge tubes of the mercury pool cathode type, an electric discharge tube, a capacitor, a voltage supply, means including an electric valve for connecting said voltage supply across said capacitor, means for discharging said capacitor through the igniter of said electric discharge tube, means for connecting said voltage supply to the igniter of said discharge tube independent of said valve and discharge means, means for connecting a supply line to the cathode of said discharge tube, said line and supply voltages being connected to the control circuit so that the line voltage to the cathode and supply voltage to the igniter will be opposed so that the resultant voltage will be the arithmetical difference of the two voltages and the maximum voltage of any point in the control circuit will never exceed the greater of said line and supply voltages during the non-firing condition.

6. In a system for initiating the conduction of electric discharge tubes of the mercury pool cathode type, and electric discharge tube, a capacitor, a voltage supply, means including an electric valve for connecting said voltage supply across said capacitor, means for discharging said capacitor through the igniter of said electric discharge tube, means for connecting said voltage supply directly to the igniter of said discharge tube and to the cathode of said discharge tube only through said valve and discharge means, means for connecting a supply line to the cathode of said discharge tube, whereby the line voltage to the cathode and the supply voltage to the cathode will be opposed and in the non-firing condition of the system the maximum voltage at any point in the control circuit will not exceed the greater of said line and supply voltages.

HARRIS I. STANBACK.
ERNEST G. ANGER.

REFERENCES CITED

The following references are of record in the file of this patent:

UNITED STATES PATENTS

| Number | Name | Date |
|---|---|---|
| 2,306,229 | Somerville | Dec. 22, 1942 |
| 2,315,926 | Bivens | Apr. 6, 1943 |